June 11, 1935.  B. NIER  2,004,826
HURRICANE LANTERN
Filed May 6, 1933  3 Sheets-Sheet 1

B. Nier
INVENTOR

By Marks & Clerk
Attys

June 11, 1935. B. NIER 2,004,826
HURRICANE LANTERN
Filed May 6, 1933 3 Sheets-Sheet 2
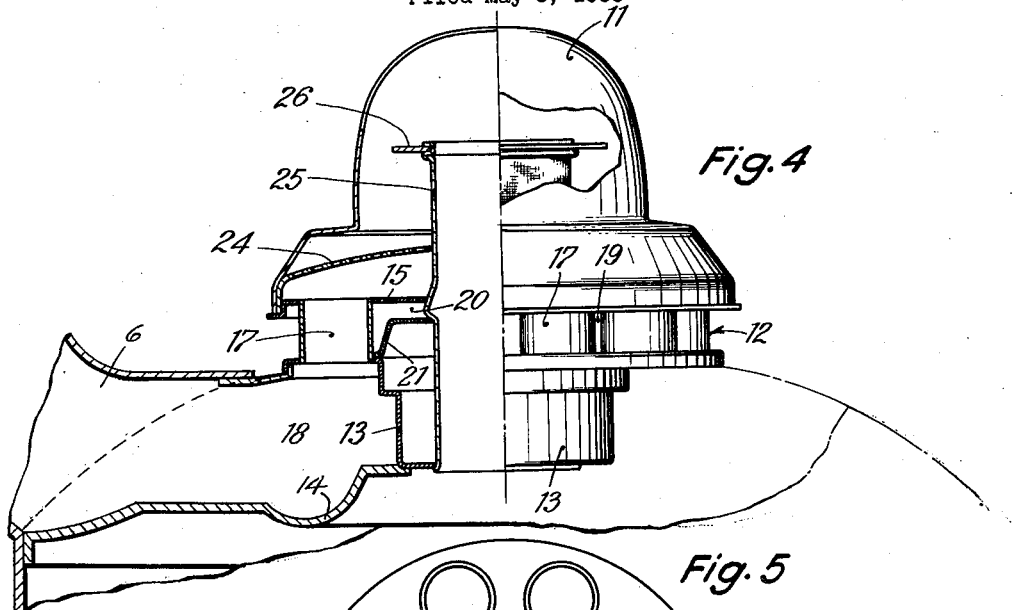
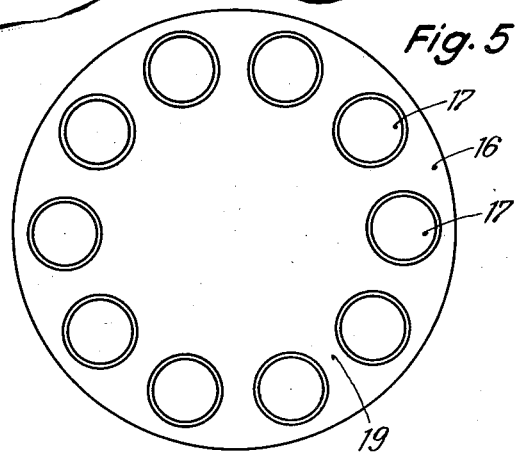
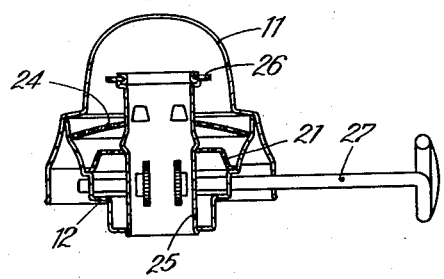
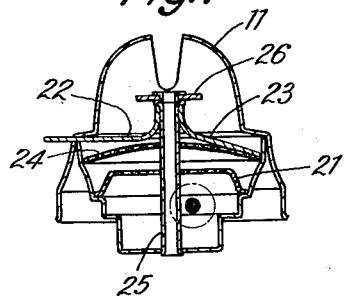
B. Nier
INVENTOR
By: Marks & Clark
ATTYS.

June 11, 1935.   B. NIER   2,004,826
HURRICANE LANTERN
Filed May 6, 1933   3 Sheets-Sheet 3
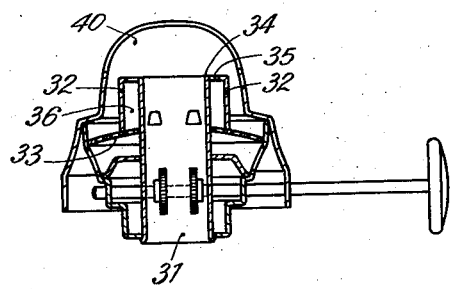
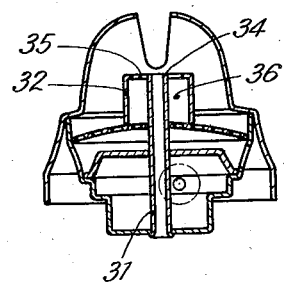
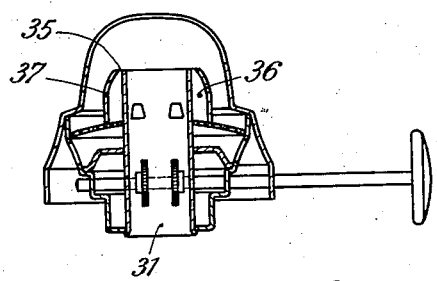
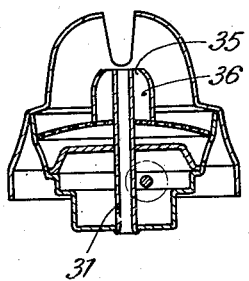
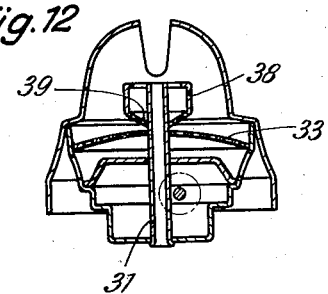
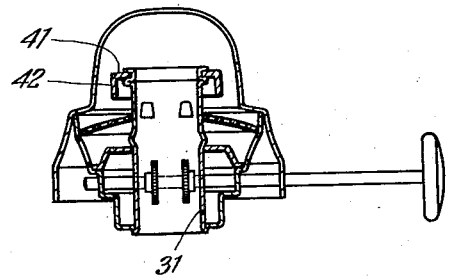
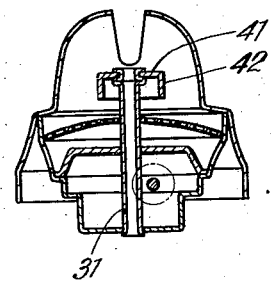

Patented June 11, 1935

2,004,826

UNITED STATES PATENT OFFICE 2,004,826

HURRICANE LANTERN

Bruno Nier, Beierfeld, Germany

Application May 6, 1933, Serial No. 669,776
In Germany May 7, 1932

7 Claims. (Cl. 240—27)

Of the hurricane lanterns most widely employed, those with a fresh air supply have a luminous intensity of about 6 Hefner candle power. To produce this lighting power seven-line burners are used. These burners are lodged in lanterns of a certain size, and taking into consideration the entire space between the sieve-plate which carries the lamp chimney and the outlet for the combustion gases at the top of the lantern chimney, for the smallest lantern on sale nowadays and satisfying the requirements in question there is an air chamber of 870 cubic centimeters, that is to say, an air space of 145 cubic centimeters per Hefner candle, when the calculation is based on the generally observed luminous intensity of 6 Hefner candles. The total size of the lantern corresponds with this air space. Upon this depends the quantity of raw materials to be employed for the manufacture as well as the amount of expenditure upon wages and the like.

The quality of a hurricane lantern, however, is determined not only by a certain luminous intensity and by the cost of the manufacture and the selling price, but also by whether it burns without odor or not. It may be observed that a lantern of the construction hitherto usual, after burning for some time, evolves an obnoxious smell, a phenomenon which is to be attributed to the fact that these lanterns do not entirely consume the petroleum supplied by the wick.

The object of this invention is to obtain about the same normal luminous intensity as hitherto with a lantern which requires, for the production of 1 Hefner candle unit, an air space of not more than 120 cubic centimeters and which, on account of the complete combustion attained by it of all the substances contained in the petroleum, burns without odor.

The invention is illustrated by way of example in the accompanying drawings, in which:

Fig. 1 shows an elevation view of the lantern;
Fig. 2 shows a similar view of the burner hood thereof;
Fig. 3 is a similar view of the burner;
Fig. 4 shows a side view of the burner in a modified constructional form, partly in section;
Fig. 5 shows a plan of air-supplying means especially provided for this form of construction;
Figs. 6 and 7 show another somewhat modified form of construction of the burner in two sectional elevations at right angles to one another;
Fig. 8 shows a further constructional form of the burner in sectional elevation;
Fig. 9 shows a sectional elevation of this form taken at right angles to Fig. 8;
Fig. 10 shows in sectional elevation a modified form of the burner shown in Fig. 8;
Fig. 11 is a sectional elevation of this form taken at right angles to Fig. 10;
Fig. 12 shows a further form of construction in sectional elevation;
Fig. 13 shows yet another modified form of construction in sectional elevation;
Fig. 14 shows a section of this constructional form taken at right angles to Fig. 13;
Fig. 15 is a vertical sectional view of Fig. 1, showing the passages for air and for the products of combustion, and
Fig. 16 is a cross-sectional view of Fig. 15 on lines 16—16.

The lantern is built in the usual way. Fig. 1 shows a lantern using a 5-line burner only. An important feature, however, is that the lantern top 1 is about 15% less distant from the burner hood 2 than in the usual lanterns of the smaller size, having the normal luminous intensity of about 6 Hefner candle power.

A total air space of 420 cubic centimeters is created in the relatively small interior between the sieve plate 3 and the exit openings 7 of the chimney so that there is a space of only about 70 cubic centimeters per Hefner candle. The flame is thereby brought nearer to the lantern head which has become smaller, and this lantern head becomes more highly heated than with the known constructions even in the case of the smallest hurricane lanterns on the market. The increase of temperature compared with known lanterns here amounts to about 100° C. at the upper smoke-bell cover, and to about 10° C. at the junction of the air supply tubes 6 with the chimney top, so that at these places temperatures of 375 and 80 degrees, respectively, are obtained instead of 275 and 70 degrees, at outside temperatures of about 18 to 20 degrees. By this greater heating the air circulation is considerably increased, the masses of air inside the lantern chimney receiving considerably increased buoyancy. This upward urge brings about a quick flow of fresh air through the lower sieve plate 3 of the lantern, as well as a quick influx of fresh air into the lateral air-tube apertures. By these means an accelerated speed of circulation of the masses of air moved by the greater heating is caused, this air being noticeably preheated.

This preheated air which is conducted into the air chamber 5 situated underneath the burner hood 2 together with the increased air supply through the sieve 3 causes such a considerably greater intensity of combustion that with the small lantern the same candle power is obtained as with the usual combustion spaces which are about twice as large, the better combustion being evidenced by an entire absence of odor. The air supply tubes 6 must, of course, be of such a large cross-section that the air necessary for the intensive combustion may be able to pass through in an unobstructed manner.

Experiments have proved that a cross-sectional area of less than 100 square millimeters for the air tubes does not allow sufficient air to pass through, the best results being obtained with a cross-section of about 180 square millimeters. This upper limit need not be so strictly adhered to, since cross sections of 280 square millimeters still give serviceable results.

The success of this lantern structure arises from a proper proportioning as regards volumes of the two air spaces under consideration, namely the air space below the burner and below the burner hood and the air space above the burner hood, these two spaces being separated from one another by the burner hood itself and communicating with one another by way of the slot in the burner hood.

A hurricane lantern of the kind which is described burns steadily and without smoke in temperature zones, at atmospheric temperatures up to approximately 25° C., but is liable to smoke like other known lanterns if the surrounding temperature is appreciably above 25 degrees. It has now been found that this undesirable phenomenon can be caused to disappear if provision is made for an ample removal of the heat of combustion arising just at the end of the wick sheath as a result of the burning of the lantern. The means hereinafter described for removing this heat are also applicable to lanterns of ordinary dimensions, in which case they enable the candle power of such lanterns to be increased by increasing the air supply from underneath through the sieve plate 3, without rendering the flame liable to deposit soot as soon as any movement of the external air occurs, or even to become extinguished in the event of gusts of wind impinging upon the lighted lantern.

In the form of construction illustrated in Figs. 4 and 5, 11 is the head or hood of the burner which has an under portion generally designated by 12, fitted about the open top of the oil container 14, the upper part of which container constitutes a burner chamber 18.

The under member 12 of the burner has a perforated plate 15 which carries the burner hood 11. With the plate 15 is operatively associated an inner perforated plate 16. Fixed to the plate 16 about the perforations therein are a circular series of air conducting tubes 17, the upper edges of which engage in the perforations of the plate 15, so that the tubes in effect extend downwardly from 15 and are spaced relatively to each other as at 19. By the perforated internal plate 16 the admission of air to the burner hood is rendered possible. From the burner chamber 18 the air passes through the tubes 17 into the burner hood. Through the spaces 19 between the individual passages 17 air can also enter and cool the wick sieve in the zone 20 and at the same time cool the cover plate 21. Furthermore the passages 17 are hereby air cooled and the air supplied to the burner hood is thereby cooled simultaneously with the cooling of the under part of the burner at 20 and 21. The wick sheath is denoted by 25, the frame plate connected therewith by 26, and the perforated cover sieve by 24. It is to be noted that the plate 16 is formed with a central depression 13, the bottom of which is apertured to receive the wick sheath 25, the latter being in beaded engagement therewith.

The heat of combustion arising at the top of the wick sheath owing to the burning of the lantern can be rapidly removed by making the wick sheath or other constituent parts of the burner connected therewith of a material that conducts heat appreciably better than brass or sheet iron or tin plate, which have hitherto been used for this purpose. The first material that suggests itself for this purpose is copper. The parts that should be made of copper and like good conductors of heat for this purpose are shown in Fig. 6, namely the wick sheath 25, the flame plate 26, the perforated cover plate 21, the perforated cover sieve 24, the under portion 12 of the burner and also if desired the wick actuating means 27. One or another of these parts or several of them as required may be made of the better conducting material. Experiments have shown that it is especially important to make these parts of copper which are in direct contact with the wick sheath 25, or, of course, as already stated the wick sheath itself.

Alternatively separate metal strips may be inserted in the burner to conduct the heat away, either entirely in the interior of the burner, or better still, in such a way that they terminate outside the burner, and thus conduct the heat away from the under portion of the burner when it becomes hot. Thus, in Fig. 7 special supplementary copper strips 22 are connected with the wick sheath, one strip 23 being completely inside the burner, and the other strip 22 terminating outside the burner.

According to the invention, as has already been emphasized either the wick sheath 25 or the cover plate 21 or the perforated cover sieve 24 or else the under part 12 of the burner or finally the wick actuating means 27 may be made of copper. Any one of these parts if made of a material of sufficient thermal conductivity, especially copper, is adapted to enable the known burners hitherto employed to be satisfactorily used even at high external temperatures. The effect is particularly good if all the parts of the under member 12 of the burner which guides the wick are made of copper. It may, however, be emphasized that it is quite sufficient if one or another of these parts, preferably the wick sheath, is made of copper. A particularly satisfactory arrangement is to make the under part 12, the cover sieve 24, the flame plate 26 and the cover plate 21 of tinned sheet iron (tin-plate) and to make the wick sheath 25 of copper.

Instead of copper, copper alloys that are rich in copper such as pinchbeck and the like, or aluminum, may be employed. The decisive factor is primarily only the thermal conductivity, which must be so great that the heat evolved at the wick sheath when the lantern is burning is conducted away so quickly that there is no formation of smoke at the flame.

Another method of removing the heat of combustion arising at the top of the wick sheath is by directing an energetic current of air towards this point. Means for effecting this are illustrated in Figs. 8 to 12. In these and the succeeding figures the wick sheath is denoted by 31. In Figs. 8 and 9 the upper part of the wick sheath is surrounded by a jacket 32. This jacket is mounted with its lower edge upon the cover sieve 33. Between the upper edge 34 of the wick sheath 31 and the member 32 there is an aperture or gap 35, and between the member 32 and the wick sheath 31 there is an intervening space 36 which acts like a chimney and occasions a very energetic movement of air thereby producing a cooling effect.

In the form of construction illustrated in Figs. 10 and 11 the member 37 corresponding to the member 32 of Figs. 8 and 9 is somewhat bent or curved. Here again, however, the outer body 37 does not come close to the upper edge of the wick sheath but leaves a gap 35 between them, and the jacket 32 leaves an intervening space 36 between the two members, and this space again acts as a chimney.

In the constructional form illustrated in Fig. 12 the outer body or jacket 38 is not secured upon the cover sieve 33 but is directly fitted to the wick sheath by an especially perforated part 39.

As already stated there is a considerable cooling of the wick sheath in the constructional forms illustrated in Figs. 8 to 12, particularly at the upper edge thereof. Owing to the fact that part of the air ascending from the lower part of the burner through the cover sieve 33 traverses the space 36 while the remainder of it passes directly into the burner hood 40. The space 36 thus acts like a chimney and the burners made in this way are reliable in operation at all practicable external temperatures.

In many cases, however, it is sufficient if the cooling is brought about by an arrangement such as that illustrated in Figs. 13 and 14. In this case the wick plate or flame plate 41 is drawn perpendicularly downwards and thereby forms a wall 42. When the air flows in an upward direction the wall 42 located in this current of air and the whole of the flame plate 41 and therefore also the wick sheath are so energetically cooled that satisfactory burning of the lantern is ensured.

Figure 1:
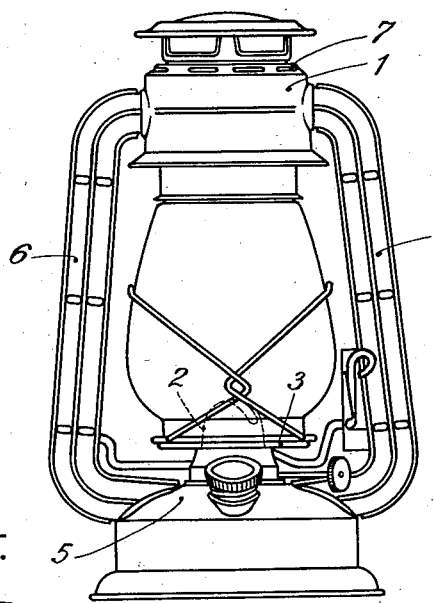
Figure 2:
Figure 3:
Figure 15:
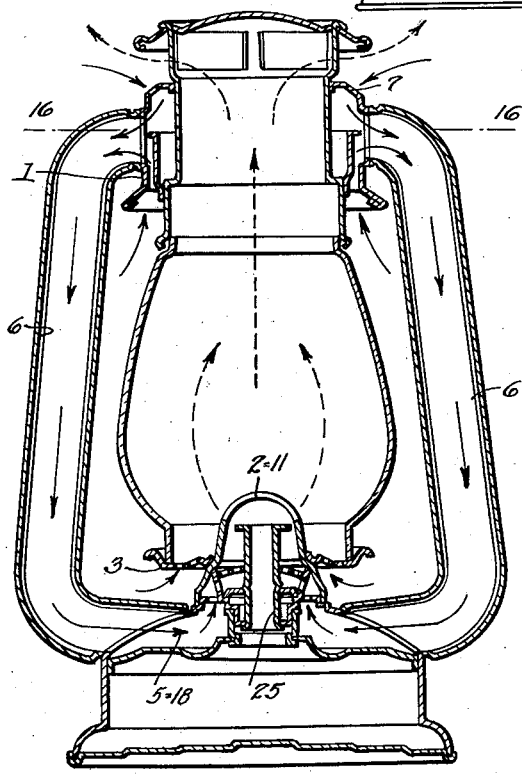
Fig. 15 illustrates the passages for air and the products of combustion. The full lined arrows indicate the inlet passages for air while the dash-lined arrows indicate outlet passages for the products of combustion.
Figure 16:
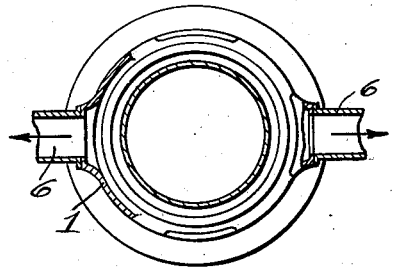
Fig. 16 shows a cross-section of Fig. 15 on line 16—16.

I claim:

1. A hurricane lantern of the wick type burning liquid fuel, comprising a glass chimney, a sieve plate carrying the glass chimney, and a lantern head located above the glass chimney and formed with apertures for the escape of the gaseous products of combustion, the space between the sieve plate and the apertures in the lantern head not exceeding 120 cubic centimeters per Hefner candle power produced.

2. A hurricane lantern as claimed in claim 1, further comprising a wick sheath, and means for facilitating the rapid renewal of the heat generated at the wick sheath by the burning of the lantern.

3. A hurricane lantern burner comprising a wick sheath, and strips of copper connected at one end with the top of the wick sheath, the said strips of copper extending transversely to the current of air flowing upwardly around the wick sheath and being adapted to conduct away rapidly the heat generated at the wick sheath by the burning of the lantern.

4. A hurricane lantern burner comprising a wick sheath, and a large flame plate surrounding and secured to the upper part of the wick sheath, the margin of the flame plate being so bent downwardly as to form a closed jacket surrounding the upper part of the wick sheath and leaving an annular space between itself and the wick sheath, and the jacket being open at the bottom so that the current of air flowing upwardly around the wick sheath impinges strongly upon the said jacket to remove the heat therefrom.

5. A hurricane lantern burner adapted to be mounted in an oil container, the upper part of which constitutes a burner chamber, comprising a wick sheath, a burner hood extending over and around the upper end of the wick sheath, a plate perforated with a ring of apertures of substantial size surrounding the under portion of the burner and carrying the burner hood, means for admitting air for combustion to the burner chamber, vertical metal tubes of the same cross-section as the apertures in the perforated plate, these tubes extending downwardly from the said apertures and communicating at their lower ends with the burner chamber, so that air for combustion can pass from the burner chamber through the tubes into the burner hood, the external surfaces of the tubes being exposed to the atmosphere and being spaced apart so that atmospheric air can have free access between them so as to cool the tubes, the under portion of the burner and the part of the wick sheath extending below the perforated plate.

6. A hurricane lantern, as claimed in claim 1, in which the sieve plate carrying the chimney is made of metal, the lantern further comprising a metallic wick sheath, a metallic flame plate secured to the upper end of the wick sheath, a metallic cover sieve surrounding the central part of the wick sheath, and metallic wick actuating means, some of the said metallic parts, including the wick sheath, being made of a metal which is a very good conductor of heat such as copper.

7. A hurricane lantern of the wick type burning liquid fuel, comprising a glass chimney, a metallic sieve plate carrying the glass chimney, a lantern head located above the glass chimney and formed with apertures for the escape of gaseous products of combustion and including a metallic wick sheath, a metallic flame plate secured to the upper end of the wick sheath, a metallic cover sieve surrounding the central part of the wick sheath, and metallic wick actuating means, the wick sheath being made of a metal which is a very good conductor of heat such as copper.

BRUNO NIER.